United States Patent [19]
Nakajima et al.

[11] Patent Number: 5,254,050
[45] Date of Patent: Oct. 19, 1993

[54] POWER TRANSMISSION BELT

[75] Inventors: Masayoshi Nakajima, Motoyamaminamimachi; Kazuhiro Takeda; Kazutoshi Ishida, both of Kobe, all of Japan

[73] Assignee: Mitsuboshi Belting Ltd., Japan

[21] Appl. No.: 676,089

[22] Filed: Mar. 27, 1991

[30] Foreign Application Priority Data

Mar. 29, 1990 [JP] Japan .................................. 2-83142

[51] Int. Cl.$^5$ .............................................. F16G 1/08
[52] U.S. Cl. ........................................ 474/260; 474/271
[58] Field of Search .............................. 474/260–265, 474/268, 271; 428/36.8; 524/507–509, 511; 525/130, 131

[56] References Cited

U.S. PATENT DOCUMENTS 4,699,832 10/1987 Sattelmeyer ................... 474/271 X
4,868,029 10/1987 Nakagawa et al. .

FOREIGN PATENT DOCUMENTS 0040908 12/1981 European Pat. Off. .
0109990  6/1984 European Pat. Off. .
0229949  7/1987 European Pat. Off. .
62-200050  9/1987 Japan .
62-246951 10/1987 Japan .
1-299853 12/1989 Japan .

OTHER PUBLICATIONS

DuPont Product Information Sheet for Acsium.
Abstract—Japanese Laid Open Publication 1-299853; Dec. 1989.
Abstract—Japanese Laid Open Publication 63-74632; Apr. 1988.

*Primary Examiner*—Thuy M. Bui
*Attorney, Agent, or Firm*—Wood, Phillips, VanSanten, Hoffman & Ertel

[57] ABSTRACT

A power transmission belt having improved service life in high and low temperature environments is disclosed. The power transmission belt includes a compressed rubber layer of a low density chlorosulfonated polyethylene having a straight-chain molecular structure which is formed so that the chlorine content is within the range of about 15 to about 35% by weight. The chlorosulfonated polyethylene can have a sulfur content in the range of about 0.5 to about 2.5% by weight. A magnesium oxide-aluminum oxide solid solution can be admixed with the chlorosulfonated polyethylene. The power transmission belt can also include an adhesion rubber layer made of a chloroprene rubber composition or a hydrogenated acrylonitrile-butadiene rubber composition with at least one tension member at least partially embedded therein.

23 Claims, 1 Drawing Sheet

POWER TRANSMISSION BELT

TECHNICAL FIELD

The present invention relates to a power transmission belt, and more particularly to a power transmission belt that can be a V ribbed belt or a V-belt with improved service life in operation either in a high or low temperature environment.

BACKGROUND OF THE INVENTION

As a result of the demand for energy savings and the more compact design of the engine compartment of a passenger vehicle, the temperature level in the engine compartment has increased as compared to the earlier engine compartments. The increased temperature level also means that the operational temperature level of the power transmission belt has increased.

A conventional power transmission belt is formed mainly from natural rubber, styrene-butadiene rubber, or chloroprene rubber and has a hardened portion of a compressed rubber layer. The compressed rubber layer receives deformative forces during the running of the belt. However, in a high temperature environment the hardened portion cracks after a relatively short time period which can shorten the useful life of the belt.

Improvement of the heat resistance of chloroprene rubber has been achieved to a certain degree. However, use of chloroprene rubber itself limits the amount of improvement that can be achieved. Therefore, satisfactory improvement has yet to be made.

In view of the above facts, studies are being undertaken in the use of rubber materials whose principal chain is highly or completely saturated. Representative rubber material include chlorosulfonated polyethylene rubber, hydrogenated acrylonitrile-butadiene rubber, fluororubber, and the like, all of which have excellent heat resistance. Among these rubber materials, it is known that chlorosulfonated polyethylene generally has the same dynamic fatigue resistance, abrasion resistance, and oil resistance as chloroprene rubber. However, the water resistance of chlorosulfonated polyethylene is highly influenced by the vulcanizing substance, particularly the acid accepter.

Generally, oxide materials such as MgO or PbO have been conventionally used as an acid accepter for chlorosulfonated polyethylene to react with HCl produced during chlorosulfonating to produce $MgCl_2$ and water and $PbCl_2$ and water, respectfully. Although use of a lead compound such as PbO or $Pb_3O_4$ as an acid accepter can achieve the production of a belt having good water resistance, the use of such lead compounds is not desirable in terms of incurring environmental pollution or sanitary problem. When MgO is used as an acid accepter, $MgCl_2$ generated during the crosslinking reaction process significantly reduces water resistance of the resulting product which means utilization of MgO in a belt is undesirable.

When an epoxy system acid accepter is used instead of a metal oxide, a composition having superior water resistance can be obtained. Unfortunately the epoxy system produces an unpleasant odor.

As a solution to the above-mentioned problems it has been proposed in Japanese Patent Laid-open No. 62-246951 to make a power transmission belt made of a chlorosulfonated polyethylene rubber-containing composition containing a magnesium oxide-aluminum oxide solid solution as an acid accepter at least in the compressed rubber layer of the power transmission belt. This power transmission belt has a longer service life in a high temperature environment as compared with a chloroprene rubber belt and exhibits excellent heat resistance. Unfortunately, the chlorosulfonated polyethylene rubber belt has a shorter service life when utilized at a temperature not higher than −30° C. The reason for the shorter low temperature service life is presently believed to be because the conventional chlorosulfonated polyethylene (referred to as CSM) is formed by chlorosulfonating a straight-chain high density polyethylene usually having a density of 0.946 to about 0.970 grams per cubic centimeter to produce a CSM having a chlorine content of 35% by weight. This relatively high chlorine content is presently believed to maintain the rubber resiliency by disrupting the polyethylene crystals which results in increasing the chlorine cohesion energy to harden the rubber itself at a low temperature causing lower rubber resiliency and the formation of cracks.

A power transmission belt with improved operation durability and increased service life in both high and low temperature environments due to improving the composition in the compressed rubber layer to develop high and low temperature resistance of the compressed rubber layer is desirable.

SUMMARY OF THE INVENTION

The present invention is directed to a power transmission belt having a compressed layer produced from a rubber composition containing a chlorosulfonated polyethylene obtained by chlorosulfonating a linear, low density polyethylene so that the chlorosulfonated polyethylene has a chlorine content in the range of about 15 to about 35% by weight. The power transmission belt can be utilized in both high temperature and low temperature environments with improved resistance to degradation and increased service life.

The power transmission belt can also include an adhesion rubber layer produced from a chloroprene rubber composition or a hydrogenated acrylonitrile-butadiene rubber composition. The adhesion rubber layer can be placed adjacent to the compressed belt layer. At least one tension member can be at least partially embedded within the adhesion rubber layer to provide additional strength Numerous other advantages and features of the present invention will become readily apparent from the following detailed description of the invention, the figures and the appended claims.

DETAILED DESCRIPTION OF THE PREFERRED EMBODIMENT

Although this invention is susceptible to embodiment in many different forms, preferred embodiments of the invention are shown. It should be understood, however, that the present disclosure is to be considered as an exemplification of the principles of this invention and is not intended to limit the invention to the embodiments illustrated.

The present invention is directed to a power transmission belt including a compressed rubber layer wherein the compressed belt layer is produced from a rubber composition containing a chlorosulfonated polyethylene (ACSM) obtained by chlorosulfonating a linear, low density polyethylene so that the ACSM has a chlorine content within the range of about 15 to 35% by weight, preferably in the range of about 25 to 32% by weight, and preferably a sulfur content within a range of about 0.5 to about 2.5% by weight. The power transmission belt can also include an adhesion rubber layer provided with at least one tension member in the lengthwise direction of the belt, wherein the adhesion rubber layer is produced from a chloroprene rubber composition or a hydrogenated acrylonitrile-butadiene rubber composition (H-NBR).

Figure 1:
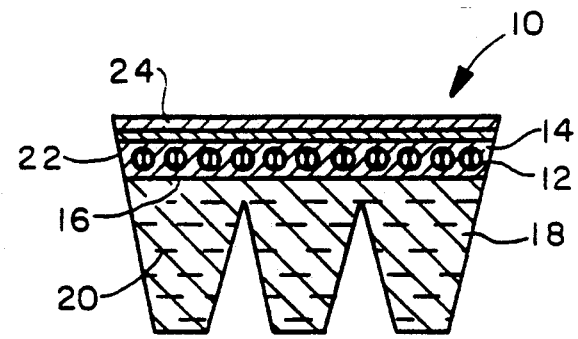
FIG. 1 is a vertical cross-section view of a V ribbed belt of the present invention.

The power transmission belt in accordance with the present invention can be a V ribbed belt or a V-belt. In a V ribbed belt 10, as shown in FIG. 1, tension members 12 are high-strength, low-extension cords or ropes at least partially embedded in an adhesion rubber layer 14. Contiguous to a surface 16 of the adhesion rubber layer 14 is a compressed rubber layer 18. The compressed rubber layer 18 includes a plurality of ribs 20 each having an approximate triangular section shape extending in the lengthwise direction of the V ribbed belt 10 The opposed surface 22 of the adhesion rubber layer 14 is provided with a rubber-coated cloth member 24.

Figure 2:
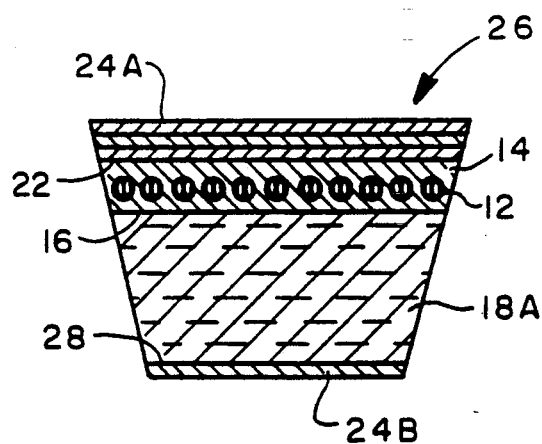
FIG. 2 is a vertical cross-section view of a V-belt of the present invention.

Referring to FIG. 2, a V-belt 26 includes the adhesion rubber layer 14 in which the tension members 12 are embedded, and a compressed rubber layer 18A contiguous with the surface 16 of the adhesion rubber layer 14. Rubber-coated cloth members 24A and 24B are provided on the opposed surface 22 of the adhesion rubber layer 14 and a surface 28 of the compressed rubber layer 18A, respectfully.

The compressed rubber layer 18 is produced from a composition that includes a low density chlorosulfonated polyethylene rubber made by chlorosulfonating a linear, low density polyethylene material having a straight molecular construction so that the ACSM formed has a chlorine content within the range of about 15 to about 35, preferably about 25 to about 32% by weight, and a sulfur content within the range of about 0.5 to about 2.5% by weight.

ACSM has an alkyl side chain that is presently believed to disrupt the formation of polyethylene crystals in the same way as chlorine disrupts the formation of the polyethylene crystals. Therefore, the chlorine content can be present in an amount not greater than about 35% by weight without the formation of polyethylene crystals. As a result, at a low temperature the cohesion force between the chlorine molecules is reduced to improve the low temperature resistance to cracking of the belt. At a high temperature, inclusion of the alkyl side chain, which is less active than chlorine, reduces the chemical reaction tendency (degradation) of the belt, which results in an improvement of heat resistance of the belt. When the chlorine content is greater than about 35% by weight, the resulting belt has insufficient high and low temperature resistance. When the chlorine content is less than about 15% by weight, the oil resistance and mechanical strength of the resulting belt is not sufficient. Thus, the chlorine content must be in the range of about 15 to about 35% by weight. In order to balance the oil resistance and high and low temperature resistance, the chlorine content is preferably in the range of about 25 to about 32% by weight.

The linear, low density polyethylene preferably has a density of about 0.87 to 0.945 grams per cubic centimeter, a number average molecular weight of about 20,000 to about 100,000 and a melt index of about 2 to about 25 grams per 10 seconds.

The alkyl group of the ACSM preferably contains about 2 to about 10 carbon atoms. Representative alkyl groups include ethyl, n-butyl, tert-butyl, isohexyl, dectyl and the like. The ACSM can contain more than one alkyl groups that are alike or different. ACSIUM TM Polymers are commercially available ACSM from DuPont Co., Wilmington, Del.

The adhesion rubber layer 14 can be a chloroprene rubber composition, hydrogenated acrylonitrile-butadiene rubber having a hydrogen incorporation rate of not less than about 80% or the like that can sufficiently adhere to the tension member. More preferably, the hydrogenated acrylonitrile-butadiene rubber has a hydrogen incorporation rate of about 90% or more. The above hydrogen incorporation rate, which indicates the amount of double bonds of the butadiene that are saturated with hydrogen, is desirable because the principal chain of the ACSM is polyethylene which has a small cohesion energy as a polymer and which can barely obtain sufficient adhesive force.

The tension members 12 preferably are heat resistance and can be polyester fibers, aromatic polyamide fibers, glass fibers and the like. Preferably, the tension member is pretreated in a conventional adhesion processing for the purpose of improving the adhesive property with adhesion rubber layer. Adhesion processing is generally performed by firstly soaking a tension member in a resorcinol-formalin-latex (RFL) and then drying the same through heating to thereby form an adhesion layer on the entire surface of the tension member. However, adhesion processing is not limited to the above method. Alternatively, the tension member can be pretreated with an epoxy resin or isocyanate compound and then treated with the RFL.

Although there is no reason to exclude the use of an acid accepter in the ACSM-containing composition from which the belt is produced, a magnesium oxide-aluminum oxide solid solution is preferred. A representative magnesium oxide aluminum oxide solid solution is $Mg_{0.3}Al_{0.3}O_{1.15}$ that can be conventionally produced from 0.7 mol % MgO and 0.45 and % $Al_2O_3$. Suitable solid solution include KW-2000 and KW-2100 produced by Kyowa Chemical Industries Co. Ltd.

The acid accepter is preferably present in an amount in the range of 1 to about 50 parts by weight, more preferably about 4 to about 20 parts by weight with respect to 100 parts by weight of ACSM. When the magnesium oxide-aluminum oxide solid solution is the acid accepter and it is present in an amount less than 1 part by weight, hydrogen chloride generated in the crosslinking process cannot be removed sufficiently. Therefore the amount of the crosslinking points of ACSM is reduced and the ACSM fails to obtain the desired degree of vulcanization which results in the formation of a belt that has inferior heat resistance while easily generating cracks at an early stage. When the amount of the acid accepter exceeds 50 parts by weight, the Mooney viscosity becomes extremely high posing a difficulty in the finishing of the belt.

The magnesium oxide-aluminum oxide solid solution can be incorporated into the ACSM-containing composition during the mixing process. Alternatively, in order to improve the dispersibility, the solid solution can be preliminarily processed with an anionic surface active agent (surfactant), e.g., sodium stearate, a silane coupling agent, or the like.

The aforesaid ACSM-containing composition can include general use, conventional carbon black, softening agents, antioxidants, processing aids, pressure sensitive adhesives, vulcanization accelerators, organic or inorganic short, cut fibers and the like.

There is no limitation as to the method of mixing the above-mentioned components of the ACSM-containing composition. For instance, banbury mixers, kneaders, and the like can be used for the mixing according to appropriate conventional methods.

When putting the aforesaid belt into operation in a high temperature environment, the compressed rubber layer 18 in particular is typically subject to a chemically deteriorative environment due to the heat. Furthermore, the belt is compressed when it is placed in contact with pulleys and the compression force is released when the belt is placed out of contact with the pulleys. The cyclical application and removal of the compression force means the belt is repetitively receiving a deformative force during the operation. However, the use of the ACSM-containing composition of the present invention for the compressed rubber layer 18 ensures superior heat resistance of the belt. Controlling the chlorine content within the aforesaid range lowers the cohesion energy of the chlorine to thereby prevent the possible hardening of ACSM which results in improvement of the low temperature resistance of the belt.

The following Examples are presented by way of illustration, and not limitation, of the present invention. The amount disclosed of each component in the compositions of the Examples is the amount by weight unless otherwise indicated.

EXAMPLE 1

Preparation and Testing of the Compressed Rubber Layer

Compressed rubber layers were prepared from COMPOSITION 1 representing the composition of the present invention and the COMPARATIVE COMPOSITIONS 1 to 3. The components of the compositions are described in TABLE 1, below.

The layers were conventionally made by subjecting the components of the compositions to a mixing process in a banbury mixer and then extending the mixed compositions in a calendar roller.

TABLE 1

| COMPRESSED RUBBER LAYER | | | | |
|---|---|---|---|---|
| | COMPOSITION | COMPARATIVE COMPOSITION | | |
| COMPONENT | 1 | 1 | 2 | 3 |
| Low Density Chlorosulfonated Polyethylene[1] | 100 | — | — | — |
| Chloroprene Rubber[2] | — | 100 | — | — |
| Chlorosulfonated Polyethylene[3] | — | — | 100 | — |
| Hydrogenated Acrylonitrile-Butadiene Rubber[4] (H-NBR) | — | — | — | 100 |
| Stearic acid | 1 | 2 | 1 | 1 |
| MgO | — | 4 | — | — |
| Magnesium oxide-aluminum oxide solid solution[5] | 10 | — | 10 | — |
| Octylated-Diphenylamine[6] | — | 2 | — | 2 |
| Nickel Di-n-butyl Thiocarbamate[7] | 2 | — | 2 | — |
| Processing Oil | 8 | 8 | 8 | 8 |
| HAF carbon black | 36 | 36 | 36 | 36 |

TABLE 1-continued

| COMPRESSED RUBBER LAYER | | | | |
|---|---|---|---|---|
| | COMPOSITION | COMPARATIVE COMPOSITION | | |
| COMPONENT | 1 | 1 | 2 | 3 |
| Cotton cut thread | 20 | 20 | 20 | 20 |
| ZnO | — | 5 | — | 5 |
| N-N'-diethyl Thiuram Thiourea[8] | — | 0.5 | — | — |
| Dibenzo Thiazyl Disulfide[9] | 0.5 | — | 0.5 | 1 |
| Dipentamethylene Thiuram Tetrasulfide[10] | 2 | — | 2 | — |
| Tetramethyl Thiuram Disulufide[11] | — | — | — | 0.5 |
| Sulfur | — | — | — | 1 |

[1]Chlorosulfonated polyethylene obtained by chlorosulfonating a linear, low density polyethylene to obtain a chlorosulfonated polyethylene having a chlorine content of 27% by weight and a sulfur content of 1.0% by weight
[2]DENKA PS-40 commercially available from Denki Kagaku Kogyo Co., Ltd.
[3]Hypalon 40 commercially available from E.I. Du Pont De Nemours & CO.
[4]Zetpole 2020 commercially available from Nippon Zeon Co. Ltd.
[5]KW-2100 commercially available from Kyowa Ghemical Industries Co. Ltd
[6]An antioxidant
[7]An antioxidant
[8]A vulcanization accelerator
[9]A vulcanization accelerator
[10]A vulcanization accelerator
[11]A vulcanization accelerator The compressed rubber layers made from COMPOSITION 1 and COMPARATIVE COMPOSITIONS 1 to 3 were vulcanized at a temperature of 150° C. and a pressure of 4.1 kilogram force per square centimeter (kgf/cm$^2$) for 30 minutes and then the rubber properties thereof were tested. The properties tested were the 10% (kgf/cm$^2$) in the grain parallel direction at a temperature of 25° C. and a relative humidity of about 50 to about 60% and the extension in the grain perpendicular direction at a temperature of 12° C. after 10 days. The 10% modulus in a measure of tensile stress at 10% elongation and can be measured in accordance with ASTM D412. The percent change in extension was then calculated by the following formula which uses the test results for the COMPOSITION 1 as a example:

$$(230/290 - 1) \times 100 = -21\%$$

The test results are presented in TABLE 2.

TABLE 2

| COMPRESSED RUBBER LAYER RUBBER PROPERTIES | | | | |
|---|---|---|---|---|
| | COMPOSITION | COMPARATIVE COMPOSITION | | |
| PROPERTY | 1 | 1 | 2 | 3 |
| Grain parallel direction 10% modulus (kgf/cm$^2$) | 97 | 95 | 100 | 105 |
| Grain perpendicular direction Extension (%) | 290 | 280 | 275 | 320 |
| After 10 days at 12° C. Extension (%) | 230 | 85 | 170 | 220 |
| % Change | −21 | −70 | −38 | −31 |

As indicated by TABLE 2 the compressed rubber layer of the present invention (COMPOSITION 1) exhibits the least percent change and is therefore more desirable than the compressed rubber layers of the COMPARATIVE COMPOSITIONS 1 to 3.

EXAMPLE 2

Preparation and Testing of Adhesive Rubber Layer

Adhesive rubber layers were prepared using COMPOSITIONS 2 and 3 of the present invention and COMPARATIVE COMPOSITION 4. The components of the compositions are disclosed in TABLE 3, below. The COMPOSITION 2 was a chloroprene rubber-containing composition. The COMPOSITION 3 was an H-NBR-containing composition. The COMPARATIVE COMPOSITION 4 was a low density chlorosulfonated polyethylene-containing (also referred to herein as a ACSM-containing) composition.

The layers were conventionally made by subjecting the components of the compositions to a mixing process in a banbury mixer and then extending the mixed compositions in a calendar roller.

TABLE 3

| | ADHESION RUBBER LAYER | | |
|---|---|---|---|
| | COMPOSITION | | COMPARATIVE COMPOSITION |
| COMPONENT | 2 | 3 | 4 |
| Chloroprene Rubber[1] | 100 | — | — |
| H-NBR[2] | — | 100 | — |
| Low-Density Chlorosulfonated Polyethylene[3] | — | — | 100 |
| MgO | 4 | — | — |
| Hydrate silicic acid[4] | 20 | 20 | — |
| HAF carbon black | 25 | 25 | 40 |
| Resorcinol-formalin polymer[5] | 2 | 2 | — |
| Octylated Diphenylamine | 2 | 2 | — |
| Nickel Di-n-butyl thiocarbanate | — | — | 2 |
| ZnO | 5 | 5 | — |
| Accelerator 22[6] | 0.25 | — | — |
| Hexamethoxy-methylolmelamine | 2 | 2 | — |
| Sulfur | 1 | 1 | — |
| Accelerator M[7] | — | 1 | — |
| Tetramethyl Thiuram Disulfide | — | 1 | — |
| Dipentamethylene Thiuram Tetrasulfide | — | — | 2 |
| Magnesium oxide-aluminum oxide solid solution[8] | — | — | 8 |
| N-N'-m-phenylene dimaleimide | — | — | 1 |

[1]DENKA PS-40 commercially available from Denki Kagaku Kogyo Co., Ltd.
[2]Zetpole 2020 commercially available from Nippon Zeon Co. Ltd.
[3]Chlorosulfonated polyethylene obtained by chlorosulfonating a linear low density polyethylene to obtain a chlorosulfonated polyethylene having a chlorine content of 27% by weight and a sulfur content of 1.0% by weight
[4]HiSil 233 commercially available from P.P.G. Corp.
[5]SRF 1501 commercially available from Schenectady Chemicals, Inc.
[6]2-Mercaptoimidazolin
[7]Mercaptobenzothiazole
[8]KW-21000 commarcially available from Kyowa Chemical Industries Co. Ltd.

The test results of the polyester fiber rope adhesion force test in each adhesion rubber layer are shown in TABLE 4, below.

In the rope adhesion force test, each belt was cut into a strip having a length of 28.5 cm to make two polyester fiber ropes protrude, and then the belt and the ropes were each put between chucks and pulled to measure the rope adhesion force to the belt using a tension tester.

As can be seen in TABLE 4, the low density chlorosulfonated polyethylene-containing composition of COMPARATIVE COMPOSITION 4 yielded the lowest adhesion force indicating that it is the least desirable composition to be utilized in the adhesion rubber layer. In contrast, the chloroprene-containing composition of COMPOSITION 2 and the H-NBR-containing compositions of COMPOSITION 3 both gave satisfactory results.

TABLE 4

| | TEST RESULTS | | |
|---|---|---|---|
| | COMPOSITION | | COMPARATIVE COMPOSITION |
| TEST | 2 | 3 | 4 |
| Rope adhesion force (kgf/cm) | 10.3 | 7.6 | 3.6 |

EXAMPLE 3

Preparation and Testing of a V Ribbed Belt

In a V ribbed belt produced in accordance with the present invention, tension members of polyester fiber ropes are embedded in an adhesion rubber layer and two plies of rubber-coated cotton cloth are laminated on a surface of the adhesion rubber layer. There is provided a compressed rubber layer contiguous with an opposed surface of the adhesion rubber layer. The compressed rubber layer has three ribs that extend in the lengthwise direction of the belt. The obtained V ribbed belt is a K type 3-ribbed belt having a length of 975 millimeters (mm) based on the Rubber Manufacturers Association (RMA) standard, where the rib pitch is 3.56 mm, rib height is 2.9 mm, belt thickness is 5.3 mm, and rib angle is 40°.

Several V ribbed belts having the above structure were made from compressed rubber layers and adhesion rubber layers formed from the compositions shown in the above TABLE 1 and TABLE 3, respectively. In each of the compression rubber layers, short, cut fibers extend in the widthwise direction of each belt.

Each of the V ribbed belts was produced according to a conventional method as follows: a two-ply rubber-coated cloth material was wound around a flat surface cylindrical mold; an adhesion rubber layer was wound around the cloth; tension members were embedded in the adhesion rubber layer through spinning; a compressed rubber layer was wound around the adhesion rubber layer and then a vulcanizing jacket was attached to the compressed rubber layer to produce a combination material. The combination material was placed in a forming mold to be put in a vulcanizing pot, subjected to a vulcanizing process at a temperature of 150° C. and a pressure of about 4.1 kfg/cm$^2$ for 30 minutes, and the cylindrical vulcanizing sleeve was removed. The compressed rubber layer on the sleeve was formed to have ribs using a grinder, and the resulting rubber material was cut into a V ribbed belt.

As indicated in TABLE 5, below, BELT 1 was made using the ACSM-containing composition that is COMPOSITION 1 of TABLE 1 as the compressed rubber layer and the chloroprene rubber-containing composition that is the COMPOSITION 2 of TABLE 3 as the adhesion rubber layer. BELT 2 was made using the ACSM-containing composition that is COMPOSITION 1 of TABLE 1 as the compressed rubber layer and the H-NBR-containing composition that is COMPOSITION 3 of TABLE 3 as the adhesion rubber layer. COMPARATIVE BELT 1 was made using the chloroprene rubber-containing composition that is COMPARATIVE COMPOSITION 1 of TABLE 1 as the compressed rubber layer and the chloroprene rubber-containing composition that is COMPARATIVE COMPOSITION 4 of TABLE 3 as the rubber adhesion layer. COMPARATIVE BELT 2 was made using the chlorosulfonated polyethylene-containing composition that is the COMPARATIVE COMPOSITION 2 of TABLE 1 as the compressed rubber layer and the chloroprene rubber-containing composition that is COMPARATIVE COMPOSITION 4 of TABLE 3 as the adhesion rubber layer. COMPARATIVE BELT 3 was made using the ACSM-containing composition that is COMPOSITION 1 of TABLE 1 as the compressed rubber layer and the ACSM-containing composition that is COMPARATIVE COMPOSITION 4 of TABLE 3 as the adhesion rubber layer.

Each V ribbed belt produced was subjected to a heat resistance running test as well as a low temperature resistance running test, the results of which are shown in TABLE 5, below.

In the heat resistance running test, each V ribbed belt was mounted around a drive pulley having a diameter of 120 mm, a driven pulley having a diameter of 120 mm, and a tension pulley having a diameter of 70 mm. With the above-mentioned condition, the initial belt tension was 85 kgf, the drive pulley rotated at 3,600 revolutions per minute (rpm), the driven pulley was loaded with 10 horsepower (ps), and the belt run at an environmental temperature of 120° C. to measure the time until cracks were generated.

In the low temperature resistance running test, each V-belt was mounted around a drive pulley having a diameter of 45 mm, a driven pulley having a diameter of 45 mm and the initial belt tension was 15 kgf. After being exposed at a temperature of −30° C. for 15 hours, each belt was subject to a 5 minutes run and a 25 minute stop, a process that was repeated to measure the running time until cracks were generated in the belt ribs.

ropes (tension members), therefore a highly durable power transmission belt can be produced.

The power transmission belt of the present invention is capable of withstanding both high temperature environments and low temperature environments with increased resistance to degradation, e.g., chemical breakdown or cracking. This capability permits the power transmission belt to be utilized in applications that subject the belt to extreme temperatures and a wide range of temperatures.

This invention has been described in terms of specific embodiments set forth in detail, but it should be understood that these are by way of illustration only and that the invention is not necessarily limited thereto. Modifications and variations will be apparent from this disclosure and can be resorted to without departing from the spirit of this invention, as those skilled in the art will readily understand. Accordingly, such variations and modifications of the disclosed invention are considered to be within the perview and scope of this invention and the following claims.

We claim:

1. A power transmission belt comprising a compressed rubber layer produced from a rubber composition containing a chlorosulfonated polyethylene obtained by chlorosulfonating a linear, low density polyethylene to obtain a chlorosulfonated polyethylene having a chlorine content in the range of about 15 to about 35% by weight and an adhesion rubber layer produced from a composition that does not contain the chlorosulfonated polyethylene.

2. The power transmission belt in accordance with claim 1 wherein the chlorosulfonated polyethylene has a sulfur content in an amount in the range of about 0.5 to about 2.5% by weight.

TABLE 5

| | TEST RESULTS | | | | |
| --- | --- | --- | --- | --- | --- |
| | BELT | | COMPARATIVE BELTS | | |
| COMPONENTS | 1 | 2 | 1 | 2 | 3 |
| Compressed Rubber Layer | ACSM | ACSM | Chloroprene | CSM | ACSM |
| Adhesion Rubber Layer | Chloroprene | H-NBR | Chloroprene | Chloroprene | ACSM |
| TEST | | | | | |
| Heat Resistance (hours) | 650 | 720 | 93 | 430 | 245[1] |
| Low Temp. Resistance (hours) | 31 | 34 | 30 | 8 | 33 |

[1]Tension members protruded out of the belt edge before cracking

As is obvious from the running test results in TABLE 5, when the ACSM-containing composition is used for the compressed rubber layer and a chloroprene rubber-containing composition or a H-NBR-containing rubber composition is used for the adhesion rubber layer, as in BELTS 1 and 2, respectively, prolonged service life both in a high and low temperature environment as compared to the COMPARATIVE BELTS 1 to 3 is achieved. This prolonged service life is especially noticeable in the high temperature environment.

As mentioned above, according to the present invention, by using an ACSM-containing composition for the compressed rubber layer and preferably using a chloroprene rubber composition or hydrogenated acrylonitrile-butadiene rubber composition for the adhesion rubber layer, a belt having improved heat resistance and low temperature resistance can be obtained. Furthermore, the belt in accordance with the present invention does not lose adhesion force with the incorporated 3. The power transmission belt in accordance with claim 1 wherein the chlorine content is in the range of about 25 to about 32% by weight.

4. The power transmission belt in accordance with claim 3 wherein the chlorosulfonated polyethylene has a sulfur content in an amount in the range of about 0.5 to about 2.5% by weight.

5. The power transmission belt in accordance with claim 4 wherein the rubber composition further includes a magnesium oxide-aluminum oxide solid solution present in an amount in the range of 4 to about 20 parts by weight per 100 parts by weight of the chlorosulfonated polyethylene.

6. The power transmission belt in accordance with claim 1 wherein the rubber composition further includes a magnesium oxide-aluminum oxide solid solution.

7. The power transmission belt in accordance with claim 1 wherein the adhesion rubber layer is produced from a chloroprene rubber composition of a hydrogenated acrylonitrile-butadiene rubber composition.

8. The power transmission belt in accordance with claim 7 wherein the adhesion rubber layer has at least one tension member at least partially embedded therein.

9. A power transmission belt comprising a compressed rubber layer produced from a rubber composition containing a chlorosulfonated polyethylene obtained by chlorosulfonating a linear, low density polyethylene to obtain a chlorosulfonated polyethylene having a chlorine content in the range of about 15 to about 35% by weight and a magnesium oxide-aluminum oxide solid solution present in an amount in the range of about 4 to about 20 parts by weight per 100 parts by weight of the chlorosulfonated polyethylene.

10. A power transmission belt comprising:
a compressed rubber layer produced from a rubber composition containing a chlorosulfonated polyethylene composition obtained by chlorosulfonating a linear, low density polyethylene to obtain a chlorosulfonated polyethylene having a chlorine content in the range of about 15 to about 35% by weight; and
an adhesion rubber layer produced from a chloroprene rubber composition or a hydrogenated acrylonitrilebutadiene rubber composition.

11. The power transmission belt in accordance with claim 10 wherein the chlorosulfonated polyethylene has a sulfur content in the range of about 0.5 to about 2.5% by weight.

12. The power transmission belt in accordance with claim 10 wherein the chlorine content is in the range of about 25 to about 32% by weight.

13. The power transmission belt in accordance with claim 12 wherein the chlorosulfonated polyethylene has a sulfur content in the range of about 0.5 to 2.5% by weight.

14. The power transmission belt in accordance with claim 10 further comprising at least one tension member at least partially embedded in the adhesion rubber layer.

15. The power transmission belt in accordance with claim 14 wherein the tension member is a polyester fiber, aromatic polyamide fiber or a glass fiber.

16. A power transmission belt comprising a compressed rubber layer produced from a rubber composition containing a chlorosulfonated polyethylene composition obtained by chlorosulfonating a linear, low density polyethylene to obtain a chlorosulfonated polyethylene having a chlorine content in the range of about 15 to about 35% by weight and a magnesium oxide-aluminum oxide solid solution.

17. The power transmission belt in accordance with claim 16 wherein the magnesium oxide-aluminum oxide solid solution is present in an amount in the range of 1 to about 50 parts by weight per 100 parts by weight of the chlorosulfonated polyethylene.

18. A power transmission belt comprising a compressed rubber layer produced from a rubber composition containing a chlorosulfonated polyethylene obtained by chlorosulfonating a linear, low density polyethylene to obtain a chlorosulfonated polyethylene having a chlorine content in the range of about 25 to about 32% by weight, the chlorosulfonated polyethylene having a sulfur content in an amount in the range of about 0.5 to about 2.5% by weight and the rubber composition further including a magnesium oxide-aluminum oxide solid solution present in an amount in the range of about 4 to about 20 parts by weight per 100 parts by weight of the chlorosulfonated polyethylene.

19. The power transmission belt comprising:
a compressed rubber layer produced from an admixture of a chlorosulfonated polyethylene having a chlorine content in the range of about 15 to about 35% by weight and a sulfur content in the range of about 0.5 to about 2.5% by weight and magnesium oxide-aluminum oxide solid solution present in an amount in the range of 1 to about 50 parts by weight per 100 parts by weight of the chlorosulfonated polyethylene;
an adhesion rubber layer produced from a chloroprene rubber composition or a hydrogenated acrylonitrilebutadiene rubber composition; and
at least one tension member at least partially embedded in the adhesive rubber layer.

20. The power transmission belt in accordance with claim 19 wherein the chlorine content is in the range of about 25 to about 32% by weight and the magnesium oxide-aluminum oxide is present in an amount in the range of about 4 to 20 parts by weight per 100 parts by weight of chlorosulfonated polyethylene.

21. A power transmission belt comprising:
a compressed rubber layer produced from a rubber composition containing a chlorosulfonated polyethylene composition obtained by chlorosulfonating a linear, low density polyethylene to obtain a chlorosulfonated polyethylene having a chlorine content in the range of about 15 to about 35% by weight and a magnesium oxide-aluminum oxide solid solution; and
an adhesion rubber layer produced from a chloroprene rubber composition or a hydrogenated acrylonitrile-butadiene rubber composition.

22. The power transmission belt in accordance with claim 21 wherein the magnesium oxide-aluminum oxide solid solution is present in an amount in the range of 1 to about 50 parts by weight per 100 parts by weight of the chlorosulfonated polyethylene.

23. The power transmission belt in accordance with claim 21 wherein the magnesium oxide-aluminum oxide solid solution is present in an amount in the range of 5 to about 20 parts by weight per 100 parts by weight of the chlorosulfonated polyethylene.

* * * * *